United States Patent
Sethuraman et al.

(10) Patent No.: US 10,721,475 B2
(45) Date of Patent: Jul. 21, 2020

(54) K-NEAREST NEIGHBOR MODEL-BASED CONTENT ADAPTIVE ENCODING PARAMETERS DETERMINATION

(71) Applicant: ITTIAM SYSTEMS (P) LTD., Bangalore (IN)

(72) Inventors: Sriram Sethuraman, Bangalore (IN); Durga Venkata Narayanababu Laveti, Bangalore (IN); Nithya Viswanathan Shyla, Bangalore (IN)

(73) Assignee: ITTIAM SYSTEMS (P) LTD., Bangalore, Karnataka (IN)

( * ) Notice: Subject to any disclaimer, the term of this patent is extended or adjusted under 35 U.S.C. 154(b) by 15 days.

(21) Appl. No.: 16/118,465

(22) Filed: Aug. 31, 2018

(65) Prior Publication Data
US 2019/0075299 A1    Mar. 7, 2019

(30) Foreign Application Priority Data
Sep. 1, 2017    (IN) .............................. 201741031108

(51) Int. Cl.
| | |
|---|---|
| *H04N 11/02* | (2006.01) |
| *H04N 19/146* | (2014.01) |
| *G06K 9/00* | (2006.01) |
| *G06K 9/62* | (2006.01) |
| *H04N 19/154* | (2014.01) |
| *G06K 9/68* | (2006.01) |
| *H04N 19/179* | (2014.01) |
| *H04N 19/132* | (2014.01) |
| *H04N 19/177* | (2014.01) |

(Continued)

(52) U.S. Cl.
CPC ....... *H04N 19/146* (2014.11); *G06K 9/00711* (2013.01); *G06K 9/00744* (2013.01); *G06K 9/6276* (2013.01); *G06K 9/6857* (2013.01); *H04N 19/115* (2014.11); *H04N 19/124* (2014.11); *H04N 19/132* (2014.11); *H04N 19/154* (2014.11); *H04N 19/177* (2014.11); *H04N 19/179* (2014.11); *G06K 9/481* (2013.01); *G06K 9/6215* (2013.01); *G06N 3/0454* (2013.01); *G06N 3/0481* (2013.01); *G06N 3/08* (2013.01); *G06N 5/003* (2013.01); *G06N 20/20* (2019.01)

(58) Field of Classification Search
CPC .................................................. H04N 19/146
USPC ........................................ 375/240.01–240.29
See application file for complete search history.

(56) References Cited

U.S. PATENT DOCUMENTS

| | | | |
|---|---|---|---|
| 10,289,910 B1 * | 5/2019 | Chen ...................... | G06N 20/00 |
| 10,419,773 B1 * | 9/2019 | Wei ........................ | G06N 20/00 |

(Continued)

*Primary Examiner* — Leron Beck
(74) *Attorney, Agent, or Firm* — Prakash Nama; Global IP Services, PLLC (57) ABSTRACT

In one example, a segment of media content, a predefined maximum bitrate, and a predefined maximum quality measure may be received. K-NN having similar bitrate and quality data to the segment of media content may be determined using a trained k-nearest neighbor model. The K-NN are determined from a training set of media content segments. Further, at least one content adaptive encoding parameter for the segment of media content may be determined within the predefined maximum bitrate and the predefined maximum quality measure using the determined k-nearest neighbor. The at least one content adaptive encoding parameter is inputted to an encoder to encode the segment of media content.

26 Claims, 3 Drawing Sheets

(51) Int. Cl.
*H04N 19/115* (2014.01)
*H04N 19/124* (2014.01)
*G06K 9/48* (2006.01)
*G06N 5/00* (2006.01)
*G06N 3/08* (2006.01)
*G06N 20/20* (2019.01)
*G06N 3/04* (2006.01)

(56) References Cited

U.S. PATENT DOCUMENTS

| | | | |
|---|---|---|---|
| 2004/0002931 A1* | 1/2004 | Platt | G06K 9/6276 706/46 |
| 2004/0162834 A1* | 8/2004 | Aono | G06F 16/3344 |
| 2006/0187884 A1* | 8/2006 | Ma | H04W 40/16 370/332 |
| 2009/0322875 A1* | 12/2009 | Toyoshima | G06K 9/00771 348/143 |
| 2011/0205359 A1* | 8/2011 | Lee | G08B 13/19608 348/143 |
| 2012/0201310 A1* | 8/2012 | Yamagishi | H04N 17/004 375/240.27 |
| 2012/0219212 A1* | 8/2012 | Anbai | G06F 16/316 382/159 |
| 2013/0223510 A1* | 8/2013 | Coudurier | H04N 21/23439 375/240.02 |
| 2015/0070585 A1* | 3/2015 | Sharif-Ahmadi | G08C 17/02 348/564 |
| 2018/0068195 A1* | 3/2018 | Kolarov | G06K 9/036 |
| 2019/0028766 A1* | 1/2019 | Wold | G06N 20/00 |

* cited by examiner

K-NEAREST NEIGHBOR MODEL-BASED CONTENT ADAPTIVE ENCODING PARAMETERS DETERMINATION

RELATED APPLICATION

Benefit is claimed under 35 U.S.C. 119(a) to Indian Provisional Patent Application Serial No. 201741031108 entitled "SYSTEM AND METHOD FOR CONTENT-ADAPTIVE BIT ALLOCATION AND ENCODING RESOLUTION SELECTION IN ADAPTIVE BIT-RATE (ABR) VIDEO ENCODING" by Ittiam Systems Pvt. Ltd., filed on Sep. 1, 2017.

TECHNICAL FIELD

The present disclosure generally relates to adaptive bitrate streaming of media content, and particularly to k-nearest neighbor model-based content adaptive encoding parameters determination for the adaptive bitrate streaming.

BACKGROUND

With evolving streaming multimedia (e.g., video) technologies such as hypertext transfer protocol (HTTP)-based adaptive bitrate (ABR) streaming, users are moving from linear television (TV) content consumption to non-linear, on demand, time-shifted, and/or place-shifted consumption of content. Example streaming multimedia services may include over-the-top (OTT) delivery of video-on-demand (VOD), subscription VOD (SVOD) services, TV Everywhere (TVE) live-to-VOD services, and cloud digital video recorder (cDVR) services. Thus, multimedia content consumption through internet streaming is emerged as a preferred mode due to the ability to consume content anytime and/or anywhere. Further, HTTP based adaptive bitrate (ABR) streaming, based on specifications such as Apple's HTTP Live Streaming (HLS) or MPEG's Dynamic Adaptive Streaming over HTTP (DASH), may offer the ability for the client-side applications to select an appropriate ABR representation based on static aspects (e.g., client device properties, user preference, and the like) and dynamic aspects (e.g., available bandwidth over the end-to-end connection).

DETAILED DESCRIPTION

Some methods in HTTP-based bitrate ABR streaming may use conservative fixed bitrate/resolution ABR representation ladder. Emergence of multiple content-adaptive encoding or streaming methods have resulted in average bitrate savings and/or more consistent video quality. The achieved bit-savings may reduce the storage needs in the content delivery network edge appliances and also the average bytes served to subscribers, both of which may improve the operational efficiency of the streaming service. They may also result in better quality of experience and reduced monthly data consumption for the subscribers of the streaming service. Some methods for HTTP-based ABR streaming may require a quality metric to be evaluated to ensure that the bit savings is achieved by capping the target quality level at a given peak bitrate setting.

Further, distributed encoding has gained prominence due to the turn-around time reduction possible by concurrently generating the set of ABR representations for the HTTP Live Streaming (HLS) or Dynamic Adaptive Streaming over HTTP (DASH) segments of a title across multiple compute instances in the cloud. Distributed encoding may also offer the ability to schedule and load balance the encoding instances according to the heterogeneous attributes of the acquired compute instances. Even for the live streaming use-cases, which were using faster encoding settings on a single compute instance, limited distributed encoding and the concept of ABR segments have created the possibility of using slower encoding settings that offer a higher compression efficiency. The average bit savings possible with content-adaptive encoding are complementary and, sometimes, significant when compared to the bit savings achieved by going to slower encoding presets. Since live streaming of popular sports and reality events have millions of subscribers consuming the content close to the live time-line, efficiencies in delivery assume significance.

However, a majority of the content-adaptive methods are iterative in nature and hence can increase the latency of the live delivery use-case beyond acceptable limits, increase the cost of the live solution, or can over-complicate the content-preparation workflow if a given ABR segment itself is made to span across more than one compute instance. On the other hand, content-adaptive streaming methods tend to produce more ABR representations than required (which increases CDN storage needs) and also the granularity of selection will not fully pass on the bit-rate savings nor the consistent quality possible with content adaptive encoding. Also, the need for evaluating a perceptually meaningful quality metric for each stream and for each iteration to achieve the maximum possible bit savings further compounds the computational complexity needs.

A fixed ABR ladder specifying bitrate and resolution combinations may quantize the available bandwidth range across subscriber base (e.g., measured over some time) and identify the resolution that emerges with the highest quality over each bitrate range for an ensemble of relatively tougher to code video segments. When the segments are simpler, the configured bitrates may be higher. When configured to encode using standard 2-pass VBR encoding settings, these segments may reach a quality that is significantly higher than the quality reached by the complex segments. This can cause a fluctuation in quality levels within the same representation and a wastage of bits.

Further, an integer programming-based approach was formulated that attempted to show the scope for bit savings compared to fixed ladders, while determining encoding parameters that maximize the average quality of experience (QoE) across target audience. It was the x264 open-source encoder that proposed a constant rate-factor (CRF) mode that allowed peak bitrate to be capped while trying to achieve a consistent quality of encoding. Configuring the right CRF value to reach a certain quality target may require iterative encoding of the content at multiple CRF values across multiple resolutions. To take advantage of CRF while coding a given segment, but to identify the CRF value to configure to achieve a bits target, a neural network-based regression is proposed in prior art, where, the network takes a set of features generated from an actual encode at a constant quantization parameter. The method meets the target bitrate with +/−20% accuracy when encoded using the estimated CRF. However, the approach treats CRF value as the quality indicator and may not suggest a method for estimating the bit allocation required to not exceed the maximum perceived quality target.

For example, Netflix announced a per-title optimization approach where the ladder was adapted for each title resulting in up to 20% bit savings for certain titles. The approach was later refined to a chunk-adaptive adjustment, where the CRF corresponding to the title-level bitrate may be used to identify the chunk-level bits to allocate for the final encode in the VBR mode. The process may cap the allocated bits to a lower level than the per-title bitrate and hence may translate to additional bit savings over the title-based encoding approach. The process may involve multiple encodes at each resolution for the moderately complex content using different CRF values to obtain the rate-distortion curves at each resolution. Therefore, a need for dynamically adapting the resolution based on content complexity is desired.

While the CRF adapts the quantization level as a function of temporal complexity (e.g., relative to a constant quantizer option), by using a subjectively correlating objective quality metric, the bit savings can be further increased by fully leveraging the spatial and temporal masking present in a given content. Also, applying the same logic when going from per-title to per-chunk, determining a specific bit allocation at a segment, scene, or frame level may also be expected to increase the bit savings when compared to chunk level. These methods may perform a set of constant bitrates (CBR) or VBR encodings of each segment of a title at multiple bitrates and rely on a quality metric to guide the selection of the right bitrate representation for a given content. Further, a post-processing step on the content-preparation end may optimize the ABR ladder by removing bitrate representations that exceed a certain quality level (and pointing to lower bitrate representations that meet the quality level) and thus achieve average bitrate savings. The measured quality levels may be used by the streaming client to select a consistent quality segment or to reduce the quality fluctuations when available bandwidth changes. Content-adaptive encoding may be guided by a subjective quality metric computed at the frame-level within the encoding process and may adjust the bits consumed by the frame to ensure that the target maximum quality is not exceeded and to improve the quality of the complex frames towards a consistent quality level until the peak bitrate limits it. The process of selecting the right content-dependent resolution may require each resolution to be encoded and then the resolution that achieves the lowest bitrate at the same quality or the highest quality at the same bitrate may be selected.

While there is a large degree of variability in the computational complexity of the methods described above, it can be seen that all of them may be fundamentally iterative in nature. Even if the average iteration counts are low, the peak iteration counts may increase the latency of the solution for live use-cases. Hence, examples described herein may provide an approach that is deterministic in its complexity and is light-weight when compared to the complexity of existing content adaptive encoding workflows generating streams for a fixed ABR ladder.

Examples described herein may provide an enhanced computer-based and network-based method, technique, and system for determining content adaptive encoding parameters based on k-nearest neighbor (K-NN) model. Examples described herein may provide a non-iterative, codec-agnostic approach that employs machine learning techniques to perform consistent quality content-adaptive encoding within the constraints of a maximum bitrate in a manner that makes it equally suitable for live and on-demand workflows. Examples described herein may have the ability to take a target subjective rating level and allocate appropriate bits for each group of frames to achieve the same.

Further, examples described herein may anticipate automatic selection of the right resolution and frame-rate for a given representation within an ABR set, and content-specific encoding parameters to maximize the bit savings and/or visual quality. Examples described herein may reduce the on-line computations by relying on machine learning techniques (e.g., K-NN technique).

In the examples described herein, it is assumed that the streaming service provider may have a bitrate range measured across target audience that is indicative of sustainable peak bitrates obtained over time. Based on off-line analysis, it is assumed that the service provider may have arrived at a set of quantized peak bitrates within the range. For instance, such quantization can be performed based on finding the ratio of bitrates at one just-noticeable difference (JND) level centered at different bitrates across a set of reasonably high complexity content. The number (N) of such quantized peak bitrates ($R_{max}^i$, i=1, N) may determine the maximum number of ABR representations required (e.g., for one target display type). The service provider may also assume to have a distribution of target displays. For each target display-type (D), it is assumed that the service provider defines a not-to-exceed quality measure ($Q_{max}^N$) that corresponds to the highest quality representation in the set. It is assumed that the rate quantization process provides the guidance to derive a corresponding quality measure ($Q_{max}^i$) for each of the other (N−1) representations for that target display-type.

Further, the content-adaptive ladder determination for each ABR segment may become a problem of identifying M pairs of (B, R), where B stands for bits, R stands for spatial resolution, and (M<=N), in a manner that the segment quality is maximized within the constraints of ($R^i <= R_{max}^i$) and ($Q^i <= Q_{max}^i$), for i=1, . . . , N. The content-adaptive ladder can also be extended to consider adaptive determination of frame-rate across a small set of sub-multiples of the content frame-rate.

Figure 1A:
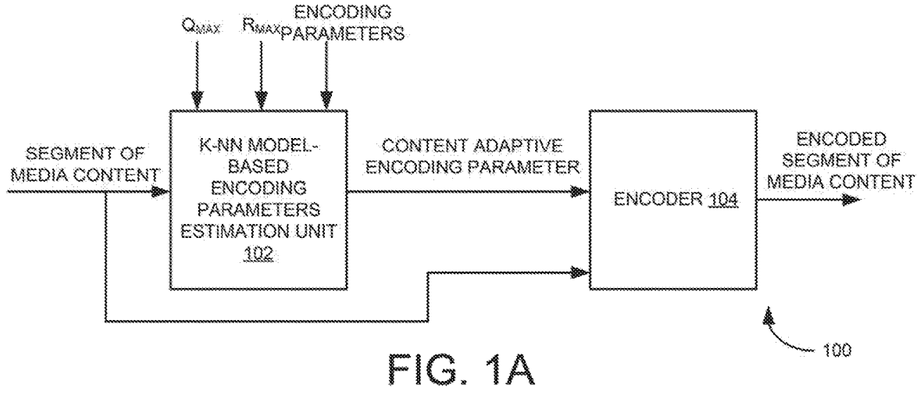
FIG. 1A is an example system to encode a segment of media content based on at least one content adaptive encoding parameter for the segment of media content.

Referring to the Figures, FIG. 2A is an example system 100 to encode a segment of media content based on at least one content adaptive encoding parameter for the segment of media content. System 100 may include a k-nearest neighbor (K-NN) model-based encoding parameters estimation unit 102 and an encoder 104 that may be communicatively connected to K-NN model-based encoding parameters estimation unit 102. K-NN model-based encoding parameters estimation unit 102 and encoder 104 may run on a same server or on different servers connected over a network. Example network may include WiFi, Ethernet, Bluetooth, radio frequency, coaxial cable, fiber optic, twisted pair, or other internet protocol (IP)-based network infrastructure. Example media content may include audio/video (AV) content such as digital television programs, movies, or any multimedia content capable of being delivered over a digital network via one or more AV streams. The segment may include a collection of predetermined number of frames. Further, the segment can be a scene, chunk, block, or the like.

During operation, K-NN model-based encoding parameters estimation unit 102 may receive a segment of media content, a predefined maximum bitrate ($R_{max}$), and a predefined maximum quality measure ($Q_{max}$). In some examples, K-NN model-based encoding parameters estimation unit 102 may also receive other encoding parameters. Further, K-NN model-based encoding parameters estimation unit 102 may determine k-nearest neighbors having similar bitrate and quality data to the segment of media content using a trained k-nearest neighbor model. In one example, the k-nearest neighbors may be determined from a training set of media content segments. Training the K-NN model is described in FIG. 2.

Furthermore, K-NN model-based encoding parameters estimation unit 102 may determine at least one content adaptive encoding parameter for the segment of media content within the predefined maximum bitrate and the predefined maximum quality measure using the determined k-nearest neighbors. An example operation of K-NN model-based encoding parameters estimation unit 102 is described in detail in FIG. 1B.

In one example, the at least one content adaptive encoding parameter may be inputted to encoder 104 to encode the segment of media content. The content adaptive encoding parameter for the segment of media content may include a content adaptive bitrate, a quantization parameter for the segment of media content, a resolution for the segment of media content, or the like. For example, the content adaptive encoding parameters may include one or more resolutions (e.g., Ultra High Definition, 1080p, 720p, 480p, and the like), one or more different data rates (e.g., bitrates), and/or the like.

Encoder 104 may encode the segment of media content based on the determined at least one content adaptive encoding parameter. Further, the examples described herein may not require modifying an existing encoder. Upon encoding, the segment of media content may be delivered to a media client via the network. Example media client may be a desktop, laptop, notebook, tablet computer, smart phone, PDA, television or other display device having a computer embedded within or attached thereto, or the like.

In the examples described herein, the segment may contain up to two partial scenes and many complete scenes, depending on the segment duration. Further, the examples described can be extended to work at the scene level to ensure consistent quality by offering additional scope for bit savings and also helps in boosting the quality of a complex scene that is present next to simpler scenes in the segment. By providing access to preceding and succeeding segments, a bit allocation that results in consistent quality can be ensured.

Thus, in a distributed content-adaptive encoding workflow, each compute instance can ingest one or more segments from the content source (e.g. a cloud storage unit), determine the content adaptive ladder using the described examples, and generate "M" different representations, in a manner independent of the other compute instances, while ensuring that consistent quality is achieved across the entire title. Thus, the turn-around time can be reduced in an on-demand content preparation scenario. In a live use-case, particularly with shorter segments, if "N" compute instances are used, each compute instance gets N*segment_duration to process one segment. This facilitates the use of higher compression presets for the live use-case. The trade-off across latency, bit savings, and complexity of the workflow may result in the proper selection of the number of compute instances in such cases.

Figure 1B:
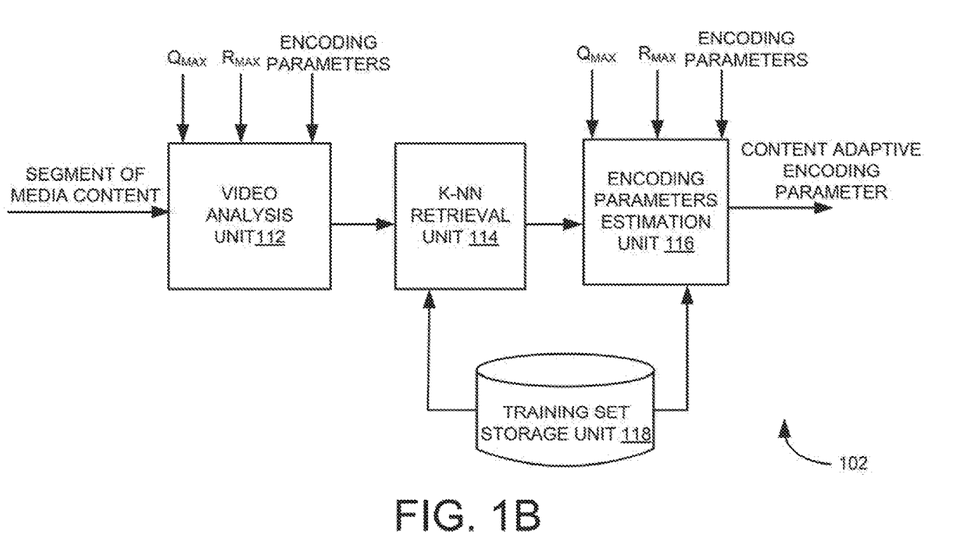
FIG. 1B is an example block diagram of a K-NN model-based encoding parameters estimation unit of FIG. 1A, illustrating components to determine the at least one content adaptive encoding parameter.

FIG. 1B is an example block diagram of K-NN model-based encoding parameters estimation unit 102 of FIG. 1A, illustrating components to determine the at least one content adaptive encoding parameter. In one example, K-NN model-based encoding parameters estimation unit 102 may include a video analysis unit 112, a K-NN retrieval unit 114, and an encoding parameters estimation unit 116, which are communicatively coupled as shown in FIG. 1B. Further, K-NN retrieval unit 114 and encoding parameters estimation unit 116 may be associated with a training set storage unit 118. For example, training set storage unit 118 may be an internal memory of system 100 of FIG. 1A or an external storage unit (e.g., a hard disk, a storage card, or a data storage medium) that can be accessible by system 100.

In operation, video analysis unit 112 may receive the segment of media content, the predefined maximum bitrate ($R_{max}$), and the predefined maximum quality measure ($Q_{max}$). In some examples, video analysis unit 112 may also receive other encoding parameters. In one example, video analysis unit 112 may perform video analysis on the segment of media content. For example, performing the video analysis may include performing a video encoding. Further, video analysis unit 112 may extract a feature vector associated with the segment of media content by performing the video analysis on the segment of media content based on the predefined maximum bitrate and the predefined maximum quality measure.

K-NN retrieval unit 114 may determine k-nearest neighbors having similar bitrate and quality data to the segment of media content using the trained k-nearest neighbor model. The k-nearest neighbors are determined from the training set of media content segments. For example, the k-nearest neighbors may be retrieved from training set storage unit 118. In one example, K-NN retrieval unit 114 may determine the k-nearest neighbors, corresponding to the feature vector, having the similar bitrate and the quality data to the segment of media content using the trained k-nearest neighbor model. Further, K-NN retrieval unit 114 may retrieve bitrate and quality data across multiple resolutions corresponding to the k-nearest neighbors.

In one example, K-NN retrieval unit 114 may evaluate a similarity metric between the feature vector for the segment of media content and feature vectors associated with the media content segments in the training set. Further, K-NN retrieval unit 114 may determine the k-nearest neighbors having the similar bitrate and the quality data corresponding to the feature vector based on the similarity metric. In one example, the k-nearest neighbor selection approach may work across different video encoding techniques and standards.

In one example, the similarity metric learning may be used to determine the k-nearest neighbors as follows. The area difference between a rate-quality curve of a given scene and a rate-quality curve of another scene over a range of qualities around a target quality level (for a given ABR representation) may be used as a measure of dis-similarity as shown in equation 1.

$$D = \left| \int_{Q_{tgt}-Q\_low(Q_{tgt})}^{Q_{tgt}+Q\_high(Q_{tgt})} (f_q(r) - f_t(r)) \right| \quad (1)$$

In equation (1), $f_q(r)$ is the quality curve as a function of bitrate for a query scene q and $f_t(r)$ is the quality curve as a function of bitrate for a training scene t, $Q_{tgt}$ is the target quality for a given ABR representation, and $Q\_low(Q_{tgt})$ and $Q\_high(Q_{tgt})$ are the target quality dependent lower and upper limits used for area computation between the two curves.

In another example, in 2-class similarity learning, for each training vector, by using the similarity metric and a threshold in the similarity metric, every other training vector may be labeled as a similar neighbor or a dis-similar neighbor. A covariance matrix Σ is learnt using this ground truth and the feature vectors of the training set. Once learnt, a Mahalanobis distance can be computed as shown in equation (2).

$$d_M = x_q \Sigma^{-1} x_t \quad (2)$$

In equation (2), $x_q = [f_q^1 \, f_q^2 \ldots f_q^N]$ is the N-dimensional self-normalized feature vector of query scene and $x_t = [f_t^1 \, f_t^2 \ldots f_t^N]$ is the N-dimensional self-normalized feature vector of training scene.

Encoding parameters estimation unit 116 may determine at least one content adaptive encoding parameter for the segment of media content within the predefined maximum bitrate and the predefined maximum quality measure using the determined k-nearest neighbors. In one example, encoding parameters estimation unit 116 may receive the predefined maximum bitrate ($R_{max}$), the predefined maximum quality measure ($Q_{max}$), and other encoding parameters for determining the at least one content adaptive encoding parameter.

In one example, determining the at least one content adaptive encoding parameter for the segment of media content may include determining the content adaptive bitrate and/or the resolution for the segment of media content within the predefined maximum bitrate and the predefined maximum quality measure using the retrieved bitrate and the quality data across the multiple resolutions.

Encoding parameters estimation unit 116 may determine the content adaptive bitrate for the segment of media content by looking-up bits required to achieve the predefined maximum quality measure for each of the k-nearest neighbors using the retrieved bitrate and the quality data. Further, encoding parameters estimation unit 116 may derive the content adaptive bitrate for the segment of media content by combining the looked-up bits for each of the k-nearest neighbors. Such combining shall ensure that the predefined maximum bitrate is not exceeded at the segment level. To ensure this, the bitrates of each scene can be adjusted in proportion of their look-up bits at the predefined maximum quality measure or by adjusting the quality of all scenes in tandem till the segment bitrate falls below the predefined maximum bitrate.

Encoding parameters estimation unit 116 may determine the content adaptive bitrate and the resolution for the segment of media content by looking-up bits required to achieve the predefined maximum quality measure for each of the k-nearest neighbors using the retrieved bitrate and the quality data at the multiple resolutions. Further, encoding parameters estimation unit 116 may derive the content adaptive bitrate and the resolution for the segment of media content based on the looked-up bits for each of the k-nearest neighbors.

For example, for each of the k-nearest neighbors and its retrieved rate-quality curve data at the resolution selected, an inverse look-up function $f^{-1}(Q)$ may be created to get the rate given the quality. In addition, the distance measure $d_i$ (d, $d_M$, or embedding distance) for each neighbor is available. In one example, the bitrate R for the query scene (e.g., for the $i^{th}$ representation) is estimated as shown in equation (3).

$$R = \frac{1}{\sum_{j=0}^{k-1} \frac{1}{d_j}} \sum_{j=0}^{k-1} \frac{1}{d_j} f_j^{-1}(Q = Q_{max}^i) \quad (3)$$

In another example, the bitrate R for the query scene for the $i^{th}$ representation is estimated as shown in equation (4).

$$R = \frac{1}{\sum_{j=0}^{k-1} e^{\frac{-d_j^2}{2s}}} \sum_{j=0}^{k-1} e^{\frac{-d_j^2}{2s}} f_j^{-1}(Q = Q_{max}^i) \quad (4)$$

For example, the content adaptive ($B^i$, $R^i$) pair for a given segment of media content for a given ($R_{max}^i$, $Q_{max}^i$) combination may be determined by subjecting the segment of media content to video analysis unit 112 to obtain a feature vector. Using the feature vector, a similarity metric may be evaluated between the feature vector for the segment of media content and the features of each of the training, up to k-nearest neighbors from the training set are identified. The (R, Q) data for the k-nearest neighbors across the resolutions are retrieved. For each of the neighbors, at each of the resolutions, the bits required at $Q_{max}^i$ are looked up. The resolution that requires the lowest number of bits at $Q_{max}^i$ may be selected as the target resolution. When the best resolutions suggested by the nearest neighbors mismatch, the resolution suggested by the closest neighbor may be used. All the bits estimate at the target resolution are suitably combined based on the similarity metric to derive the final bits estimate. Further, if $Q_{max}^i$ is reached at a bitrate higher than $R_{max}^i$, for the closest neighbor, then $R_{max}^i$, may be returned as the final bits estimate. In such cases, the resolution that achieves the highest quality at $R_{max}^i$ may be chosen as the target resolution. However, it should be noted that scenes within a segment can reach bitrates higher than $R_{max}^i$ as long as the segment level bit-rate does not exceed $R_{max}^i$. In one example, for each video encoder chosen for the final encoding, video analysis unit 112, K-NN retrieval unit 114, and encoding parameters estimation unit 116 may have to be re-tuned.

In some examples, the k-nearest neighbors can also be employed to adjust the default encoding parameters to be more suitable for the segment of media content in addition to determining the content adaptive bitrate and/or resolution. In other words, at least one encoding parameter may be determined using the trained K-NN model to encode (e.g., by the x264 encoder) the segment of media content. The at least one encoding parameter can be, but not limited to lagrangian multiplier for rate distortion optimized encoding, psy-rd strength, aq-strength, and deblocking strength.

In one example, a correction factor may be computed for the content adaptive bitrate based on a bitrate and quality achieved for the segment of media content when performing the video encoding as the video analysis. For example, during the analysis pass of encoding, in addition to the features (that also include the bitrate $R_q^{anal}$), the objective quality metric $Q_q^{anal}$ the resulting reconstructed video of the query scene q may be computed. For each scene in the training set, the rate-quality curve is generated off-line using the same encoder parameter settings as the analysis pass (in addition to the rate-quality curve at the final encoding preset). Using this analysis rate-quality curve of a given neighbor, the bitrate that the neighbor requires to reach $Q_q^{anal}$, called $R_j^{anal}$, is determined. In addition, a slope ratio adjustment factor for neighbor j, s_ratio$_j$, is computed as the ratio of local slope of the analysis R-Q curve at $Q_q^{anal}$ and the local slope of the final preset R-Q curve is computed. Using this, the adjusted bitrate for neighbor j is computed as shown in equation 5.

$$f_j^{-1}(Q = Q_{max}^i) * \left(1 + \left(\frac{R_q^{anal} - R_j^{anal}}{R_j^{anal}}\right) * \text{s\_ratio}_j\right) \quad (5)$$

In one example, instead of computing the actual objective quality metric $Q_q^{anal}$, the correction factor may be estimated through a random forest regressor that is trained to predict $Q_q^{anal}$ based on analysis time features that may also include one or more simple computation of objective quality metrics such as peak signal to noise ratio (PSNR) and its variants such as contrast sensitivity function and masking threshold based peak signal to noise ratio (commonly called as PSNR_HVSM).

In one example, the components of K-NN model-based encoding parameters estimation unit 102 may be implemented in hardware, machine-readable instructions or a combination thereof. In one example, each of the components of K-NN model-based encoding parameters estimation unit 102 may be implemented as engines or modules comprising any combination of hardware and programming to implement the functionalities described herein. The functionality of the components of K-NN model-based encoding parameters estimation unit 102 may be implemented in electronic devices such as personal computers (PCs), server computers, tablet computers, mobile devices and the like.

Further, each of video analysis unit 112, K-NN retrieval unit 114, and encoding parameters estimation unit 116 may include computer-readable storage medium comprising (e.g., encoded with) instructions executable by a corresponding processor to implement functionalities described herein in relation to FIGS. 1A and 1B. The functions of components of each of video analysis unit 112, K-NN retrieval unit 114, and encoding parameters estimation unit 116 may also be implemented by a corresponding processor. In examples described herein, the processor may include, for example, one processor or multiple processors included in a single device or distributed across multiple devices.

Even though examples in FIG. 1B describes K-NN model as including a similarity metric to determine the k-nearest neighbors, K-NN model may also use other methods such as Euclidean distance, Siamese Multi-layer perceptron network, random forest regressor, or the like for determining the k-nearest neighbors as follows:

In one example, Euclidean distance may be used as K-NN model, where each feature is self-normalized to be zero-mean and unit variance. For example, Euclidean distance in self-normalized feature space is shown in equation (6).

$$d = \Sigma \|f_q^i - f_t^i\|^2 \quad (6)$$

In equation (6), $f_q^i$ represents the self-normalized ith feature of query vector and $f_t^i$ corresponds to the self-normalized ith feature of a training vector. The k training vectors that yield the lowest distance may be declared as the k-nearest neighbors.

In another example, a Siamese Multi-layer perceptron network can be employed with an input layer that takes the query or the training vector, two or more hidden layers with each hidden layer containing a variable number of neurons with an activation function (e.g. rectified linear unit or linear activation), and a single node in the output layer that predicts whether a given training vector is similar or dis-similar to the query vector in the sense of the dis-similarity metric and the threshold in the dis-similarity metric. The last hidden layer activation can be used as an embedding for the input feature vector and the Euclidean distance between the embedding for the query vector and the embedding for the training vector can be used to compute a measure of distance between them.

In yet another example, a random forest regressor may be trained to learn to predict the area difference D between a query scene and a training scene given the feature vectors of the query scene and the training scene. Alternatively, the Siamese network described earlier is modified such that the output node predicts the area difference D through training.

Figure 2:
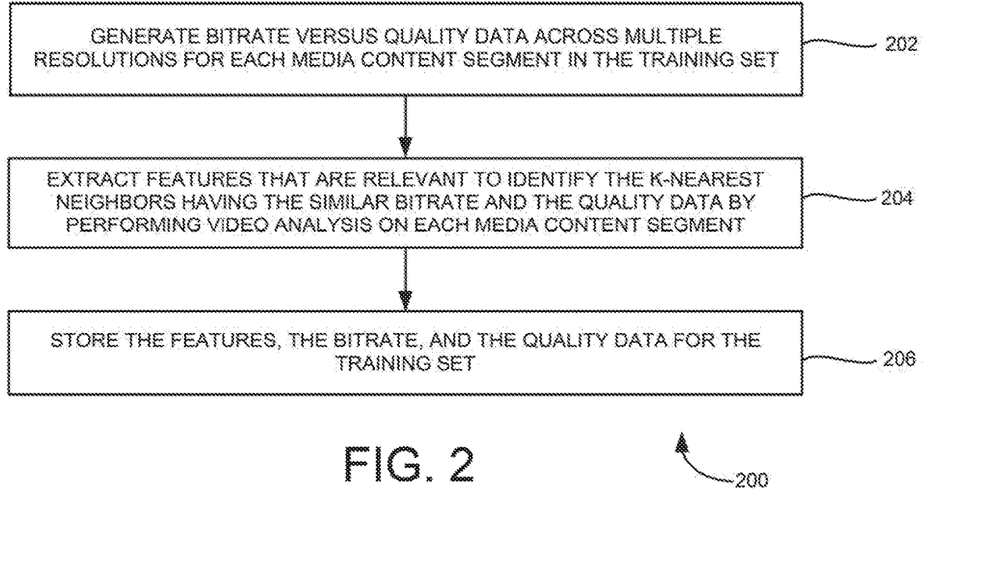
FIG. 2 illustrates an example flow diagram for training a K-NN model using a training set of media content segments.

FIG. 2 illustrates an example flow diagram 200 for training a K-NN model using a training set of media content segments. It should be understood the process depicted in FIG. 2 represents generalized illustrations, and that other processes may be added or existing processes may be removed, modified, or rearranged without departing from the scope and spirit of the present application. In addition, it should be understood that the processes may represent instructions stored on a computer readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design or fabricate circuits, generate machine-readable instructions, or use a combination of hardware and machine-readable instructions to perform the illustrated processes.

At 202, bitrate versus quality data is generated across multiple resolutions for each media content segment in the training set. At 204, feature vectors that are relevant to identify the k-nearest neighbors having the similar bitrate and the quality data may be extracted by performing video analysis on each media content segment in the training set. At 206, the feature vectors, the bitrate, and the quality data may be stored for the training set. For example, the feature vectors, the bitrate, and the quality data may be stored for the training set in a training set storage unit (e.g., training set storage unit 118 of FIG. 1B). An example for determining and storing the feature vectors, the bitrate, and the quality data is explained with respect to FIG. 3. It should be noted that the training set can be augmented over time with new segments of media content and the steps of 202, 204, and 206 shall be performed for each such new segment of media content.

Figure 3:
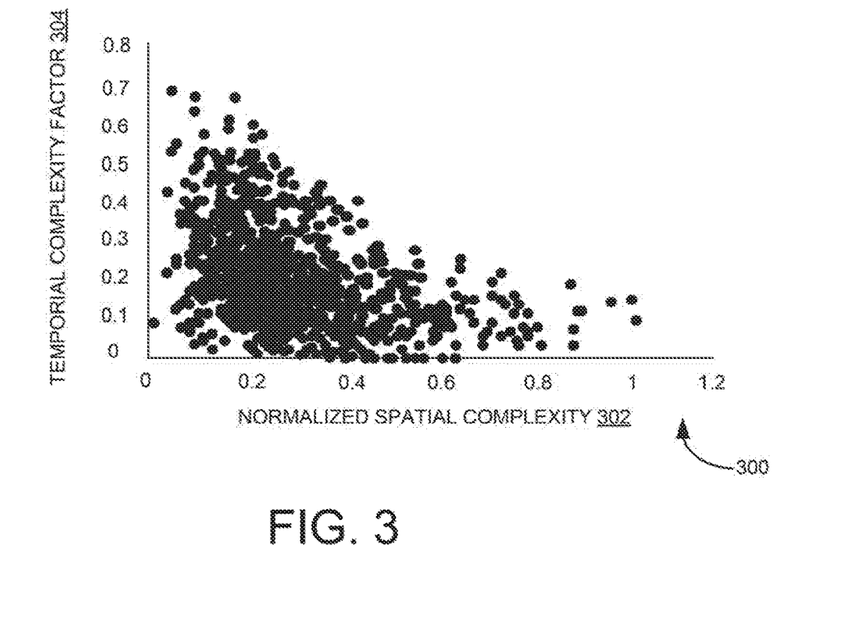
FIG. 3 is an example graph illustrating a relationship between a temporal complexity factor and a normalized spatial complexity.

FIG. 3 is an example graph 300 illustrating a relationship between a temporal complexity factor and a normalized spatial complexity. In one example, the k-nearest neighbor model may be trained using the training set of the media content segments that span a spatio-temporal complexity space as shown in graph 300. For example, a significant number of video or media segments that span the spatio-temporal complexity space are used as an off-line training set.

In one example, visualizing the complexity space in 2-D may include graph 300, where x-axis (e.g., 302) is an indicator of normalized spatial complexity and y-axis (e.g., 304) is an indicator of the temporal complexity factor relative to the normalized spatial complexity. The peak bitrate constraint may result in a lower triangular distribution of the points in the 2-D space. For each of the off-line video segments, rate vs. quality data across multiple resolutions may be obtained. A video analysis pass may be performed on each of the training segments during which multiple measures that characterize the content from a complexity perspective are collected. From these measures, features relevant to identify nearest neighbors that have similar (ft Q) curve may be obtained through a training process. The (ft Q) data and the features for the training segments may be stored in a suitable format.

One example way of extracting the features may include performing the video analysis pass using a fast encoding preset of the same encoder used for generating the final encodes. This encoding is performed in CRF mode with a CRF level selected based on $R_{max}^i$. The coding distortion (D) at each coding unit level is suitably normalized based on the quantization parameter (Q) for the coding unit and combined with the bits consumed for each frame (R) as an indicator of the encoding complexity of the frame. Hence for the $i^{th}$ frame, the complexity measure is, $C_i = R + D/f(Q)$. One f(Q) that is commonly used is $0.85 * Q^2$. For each scene in the segment, a spatial complexity factor is derived as the ratio of the maximum $C_i$ over all the frames of the scene divided by the maximum $C_i$ encountered across an ensemble of video scenes. To compute the temporal complexity factor, the D of the frame with the maximum $C_i$ in the scene is divided by f(Q) of the $i^{th}$ frame and subtracted from the D/f(Q) of the $i^{th}$ frame. This difference, if less than zero, is clipped to zero. This difference after clipping is added to R of the $i^{th}$ frame. The temporal complexity factor is derived as the ratio of the average of this modified $C_i$ over all frames other than the frame with the maximum $C_i$ in that scene divided by the maximum $C_i$ in that scene. Given that the peak bitrate is constrained, all the segments that reach $R_{max}^N$ and still do not reach $Q_{max}^N$ have to be encoded at $R_{max}^N$. After filtering out all such segments, the distribution of the remaining segments is shown in graph 300.

Another example way of extracting the features may include collecting multiple encoding time factors for each frame, such as, sum of absolute transform differences of the residuals that will be encoded, bits consumed by syntax elements other than those involved with coding the residual signal, bits consumed by syntax elements involved with coding the residual signal, resulting mean squared error difference, mean squared error difference after subtracting a masking level for each frequency coefficient based on spatial masking calculations, number of non-zero coefficients after quantization, and the mean quantization parameter after removing any fluctuations introduced for spatial activity based modulation and for factoring the level of importance through temporal re-use of the coded data. Further, the extracted features are suitably normalized and may be used in performing a multi-dimensional nearest-neighbor retrieval based on feature similarity.

Yet another example way of extracting the features may include providing complexity indicative measures associated with the segment of media content as an input to a deep learning network (e.g., a K-NN model) that is trained to predict model parameters linking visual quality and bit consumption. The features emerging in the penultimate layers of this deep learning network may be used as the features or the feature vector for performing the similarity-based retrieval from the training set.

Yet another example way of extracting the features may include using the indicative measures to train a random forest based regressor that is used to predict the objective quality metric to configure the encoder to produce for a subjective quality metric such as mean-opinion score (MOS) or differential MOS (DMOS) relative to a reference.

Figure 4:
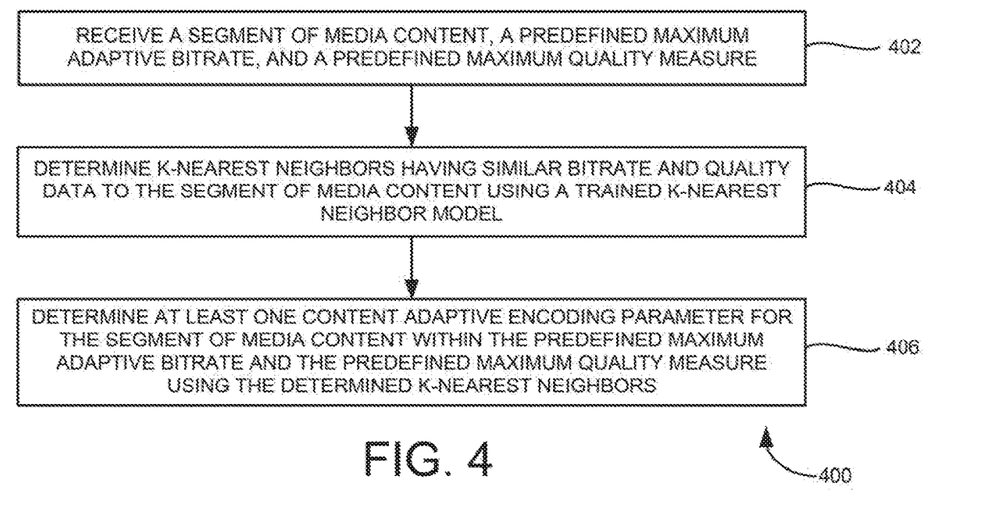
FIG. 4 illustrates an example flow diagram for determining content adaptive encoding parameters to encode a segment of media content.

FIG. 4 illustrates an example flow diagram 100 for determining content adaptive encoding parameters to encode a segment of media content. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, the segment of media content, a predefined maximum bitrate, and a predefined maximum quality measure may be received. At 404, k-nearest neighbors having similar bitrate and quality data to the segment of media content may be determined using a trained k-nearest neighbor model. The k-nearest neighbors may be determined from a training set of media content segments.

At 406, at least one content adaptive encoding parameter for the segment of media content may be determined within the predefined maximum bitrate and the predefined maximum quality measure using the determined k-nearest neighbors. The at least one content adaptive encoding parameter may be inputted to an encoder to encode the segment of media content.

Figure 5:
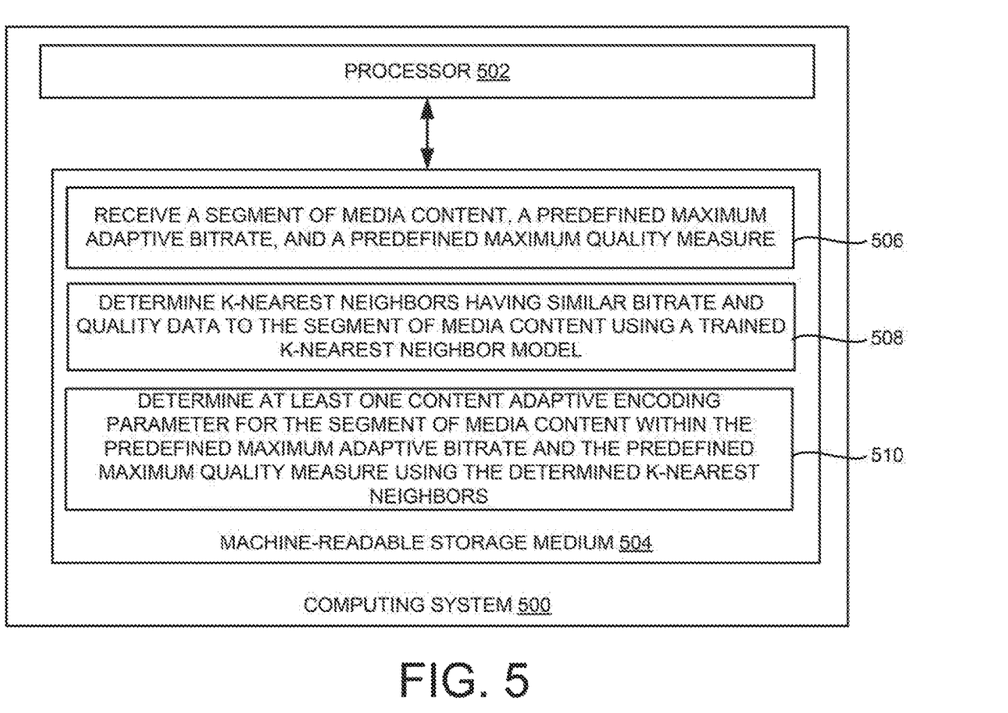
FIG. 5 is a block diagram of an example computing system including non-transitory computer-readable storage medium, storing instructions to determine content adaptive encoding parameters for a segment of media content to encode the segment of media content.

FIG. 5 is a block diagram of an example computing system 500 including non-transitory computer-readable storage medium, storing instructions to determine content adaptive encoding parameters for a segment of media content to encode the segment of media content. Computing system 500 may include a processor 502 and a machine-readable storage medium 504 communicatively coupled through a system bus. Processor 502 may be any type of central processing unit (CPU), microprocessor, or processing logic that interprets and executes machine-readable instructions stored in machine-readable storage medium 504. Machine-readable storage medium 504 may be a random-access memory (RAM) or another type of dynamic storage device that may store information and machine-readable instructions that may be executed by processor 502. For example, machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 504 may be a non-transitory machine-readable medium. In an example, machine-readable storage medium 504 may be remote but accessible to computing system 500.

Machine-readable storage medium 504 may store instructions 506-510. In an example, instructions 506-510 may be executed by processor 502 to determine content adaptive encoding parameters for a segment of media content to encode the segment of media content. Instructions 506 may be executed by processor 502 to receive the segment of media content, a predefined maximum bitrate, and a predefined maximum quality measure. Instructions 508 may be executed by processor 502 to determine k-nearest neighbors having similar bitrate and quality data to the segment of media content using a trained k-nearest neighbor model. The k-nearest neighbors may be determined from a training set of media content segments.

Further, instructions 510 may be executed by processor 502 to determine at least one content adaptive encoding parameter for the segment of media content within the predefined maximum bitrate and the predefined maximum quality measure using the determined k-nearest neighbors. The at least one content adaptive encoding parameter may be inputted to an encoder to encode the segment of media content.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
   receiving a segment of media content, a predefined maximum bitrate, and a predefined maximum quality measure;
   determining k-nearest neighbors having similar bitrate and quality data to the segment of media content using a trained k-nearest neighbor model, wherein the k-nearest neighbors are determined from a training set of media content segments; and
   determining at least one content adaptive encoding parameter for the segment of media content within the predefined maximum bitrate and the predefined maximum quality measure using the determined k-nearest neighbors;
   encoding the segment of media content by inputting the at least one content adaptive encoding parameter to an encoder.

2. The method of claim 1, wherein determining the k-nearest neighbors having the similar bitrate and the quality data to the segment of media content comprises:
   extracting a feature vector associated with the segment of media content by performing video analysis on the segment of media content based on the predefined maximum bitrate and the predefined maximum quality measure; and
   determining the k-nearest neighbors, corresponding to the feature vector, having the similar bitrate and the quality data to the segment of media content using the trained k-nearest neighbor model.

3. A method comprising:
   receiving a segment of media content, a predefined maximum bitrate, and a predefined maximum quality measure;
   extracting a feature vector associated with the segment of media content by performing video analysis on the segment of media content based on the predefined maximum bitrate and the predefined maximum quality measure;
   determining k-nearest neighbors, corresponding to the feature vector, having similar bitrate and quality data to the segment of media content using a trained k-nearest neighbor model, wherein the k-nearest neighbors are determined from a training set of media content segments;
   determining at least one content adaptive encoding parameter for the segment of media content within the predefined maximum bitrate and the predefined maximum quality measure using the determined k-nearest neighbors, wherein determining the at least one content adaptive encoding parameter for the segment of media content further comprises:
      retrieving bitrate and quality data across multiple resolutions corresponding to the k-nearest neighbors; and
      determining a content adaptive bitrate and resolution for the segment of media content within the predefined maximum bitrate and the predefined maximum quality measure using the retrieved bitrate and the quality data across the multiple resolutions; and encoding the segment of media content by inputting the at least one content adaptive encoding parameter to an encoder.

4. The method of claim 3, wherein determining the content adaptive bitrate for the segment of media content further comprises:
looking-up bits required to achieve the predefined maximum quality measure for each of the k-nearest neighbors using the retrieved bitrate and the quality data; and
deriving the content adaptive bitrate for the segment of media content by combining the looked-up bits for each of the k-nearest neighbors.

5. The method of claim 4, wherein performing the video analysis comprises performing a video encoding.

6. The method of claim 5, further comprising:
computing a correction factor for the content adaptive bitrate based on a bitrate and quality achieved for the segment of media content during performing the video encoding.

7. The method of claim 3, wherein determining the content adaptive bitrate and the resolution for the segment of media content further comprises:
looking-up bits required to achieve the predefined maximum quality measure for each of the k-nearest neighbors using the retrieved bitrate and the quality data at the multiple resolutions; and
deriving the content adaptive bitrate and the resolution for the segment of media content based on the looked-up bits for each of the k-nearest neighbors.

8. The method of claim 3, wherein determining the k-nearest neighbors, corresponding to the feature vector, having the similar bitrate and the quality data using the k-nearest neighbor model comprises:
evaluating a similarity metric between the feature vector for the segment of media content and feature vectors associated with the media content segments in the training set; and
determining the k-nearest neighbors having the similar bitrate and the quality data corresponding to the feature vector based on the similarity metric.

9. A method comprising:
training a k-nearest neighbor model using a training set of media content segments that span a spatio-temporal complexity space, wherein training the k-nearest neighbor model comprises:
generating bitrate versus quality data across multiple resolutions for each media content segment in the training set;
extracting feature vectors that are relevant to identify k-nearest neighbors having similar bitrate and quality data by performing video analysis on each media content segment; and
storing the feature vectors, the bitrate, and the quality data for the training set;
receiving a segment of media content, a predefined maximum bitrate, and a predefined maximum quality measure;
determining the k-nearest neighbors having the similar bitrate and the quality data to the segment of media content using the trained k-nearest neighbor model, wherein the k-nearest neighbors are determined from the training set;
determining at least one content adaptive encoding parameter for the segment of media content within the predefined maximum bitrate and the predefined maximum quality measure using the determined k-nearest neighbors; and
encoding the segment of media content by inputting the at least one content adaptive encoding parameter to an encoder.

10. A system comprising:
a video analysis unit to receive a segment of media content, a predefined maximum bitrate, and a predefined maximum quality measure;
a k-nearest neighbor retrieval unit to determine k-nearest neighbors having similar bitrate and quality data to the segment of media content using a trained k-nearest neighbor model, wherein the k-nearest neighbors are determined from a training set of media content segments;
an encoding parameters estimation unit to determine at least one content adaptive encoding parameter for the segment of media content within the predefined maximum bitrate and the predefined maximum quality measure using the determined k-nearest neighbors; and
an encoder to encode the segment of media content based on the at least one content adaptive encoding parameter.

11. The system of claim 10, wherein the video analysis unit is to:
extract a feature vector associated with the segment of media content by performing video analysis on the segment of media content based on the predefined maximum bitrate and the predefined maximum quality measure.

12. A system comprising:
a video analysis unit to:
receive a segment of media content, a predefined maximum bitrate, and a predefined maximum quality measure;
extract a feature vector associated with the segment of media content by performing video analysis on the segment of media content based on the predefined maximum bitrate and the predefined maximum quality measure;
a k-nearest neighbor retrieval unit is to:
determine k-nearest neighbors, corresponding to the feature vector, having similar bitrate and quality data to the segment of media content using a trained k-nearest neighbor model, wherein the k-nearest neighbors are determined from a training set of media content segments; and
retrieve bitrate and quality data across multiple resolutions corresponding to the k-nearest neighbors;
an encoding parameters estimation unit to determine at least one content adaptive encoding parameter for the segment of media content within the predefined maximum bitrate and the predefined maximum quality measure using the retrieved bitrate and the quality data; and
an encoder to encode the segment of media content based on the at least one content adaptive encoding parameter.

13. The system of claim 12, wherein the encoding parameters estimation unit is to: determine a content adaptive bitrate and resolution for the segment of media content within the predefined maximum bitrate and the predefined maximum quality measure using the retrieved bitrate and the quality data across the multiple resolutions.

14. The system of claim 13, wherein the encoding parameters estimation unit is to: look-up bits required to achieve the predefined maximum quality measure for each of the k-nearest neighbors using the retrieved bitrate and the quality data; and derive the content adaptive bitrate for the segment of media content by combining the looked-up bits for each of the k-nearest neighbors.

15. The system of claim 13, wherein the encoding parameters estimation unit is to: look-up bits required to achieve the predefined maximum quality measure for each of the k-nearest neighbors using the retrieved bitrate and the quality data at the multiple resolutions; and derive the content adaptive bitrate and the resolution for the segment of media content based on the looked-up bits for each of the k-nearest neighbors.

16. The system of claim 13, wherein the k-nearest neighbor retrieval unit is to: evaluate a similarity metric between the feature vector for the segment of media content and feature vectors associated with the media content segments in the training set; and determine the k-nearest neighbors having the similar bitrate and the quality data corresponding to the feature vector based on the similarity metric.

17. A non-transitory computer-readable storage medium having instructions that, when executed by a computing device, cause the computing device to:

receive a segment of media content, a predefined maximum bitrate, and a predefined maximum quality measure;

determine k-nearest neighbors having similar bitrate and quality data to the segment of media content using a trained k-nearest neighbor model, wherein the k-nearest neighbors are determined from a training set of media content segments; and determine at least one content adaptive encoding parameter for the segment of media content within the predefined maximum bitrate and the predefined maximum quality measure using the determined k-nearest neighbors, wherein the at least one content adaptive encoding parameter is inputted to an encoder to encode the segment of media content.

18. The non-transitory computer-readable storage medium of claim 17, wherein determining the k-nearest neighbors having the similar bitrate and the quality data to the segment of media content comprises:

extracting a feature vector associated with the segment of media content by performing video analysis on the segment of media content based on the predefined maximum bitrate and the predefined maximum quality measure; and determining the k-nearest neighbors, corresponding to the feature vector, having the similar bitrate and the quality data to the segment of media content using the trained k-nearest neighbor model.

19. A non-transitory computer-readable storage medium having instructions that, when executed by a computing device, cause the computing device to:

receive a segment of media content, a predefined maximum bitrate, and a predefined maximum quality measure;

extract a feature vector associated with the segment of media content by performing video analysis on the segment of media content based on the predefined maximum bitrate and the predefined maximum quality measure;

determine k-nearest neighbors, corresponding to the feature vector, having similar bitrate and quality data to the segment of media content using a trained k-nearest neighbor model, wherein the k-nearest neighbors are determined from a training set of media content segments; and determine at least one content adaptive encoding parameter for the segment of media content within the predefined maximum bitrate and the predefined maximum quality measure using the determined k-nearest neighbors, wherein determining the at least one content adaptive encoding parameter for the segment of media content further comprises:

retrieving bitrate and quality data across multiple resolutions corresponding to the k-nearest neighbors; and determining a content adaptive bitrate and resolution for the segment of media content within the predefined maximum bitrate and the predefined maximum quality measure using the retrieved bitrate and the quality data across the multiple resolutions, wherein the at least one content adaptive encoding parameter is inputted to an encoder to encode the segment of media content.

20. The non-transitory computer-readable storage medium of claim 19, wherein determining the content adaptive bitrate for the segment of media content further comprises:

looking-up bits required to achieve the predefined maximum quality measure for each of the k-nearest neighbors using the retrieved bitrate and the quality data; and deriving the content adaptive bitrate for the segment of media content by combining the looked-up bits for each of the k-nearest neighbors.

21. The non-transitory computer-readable storage medium of claim 20, wherein performing the video analysis comprises performing a video encoding.

22. The non-transitory computer-readable storage medium of claim 21, further comprising the instructions to:

compute a correction factor for the content adaptive bitrate based on a bitrate and quality achieved for the segment of media content during performing the video encoding.

23. The non-transitory computer-readable storage medium of claim 19, wherein determining the content adaptive bitrate and the resolution for the segment of media content further comprises:

looking-up bits required to achieve the predefined maximum quality measure for each of the k-nearest neighbors using the retrieved bitrate and the quality data at the multiple resolutions; and deriving the content adaptive bitrate and the resolution for the segment of media content based on the looked-up bits for each of the k-nearest neighbors.

24. The non-transitory computer-readable storage medium of claim 19, wherein determining the k-nearest neighbors, corresponding to the feature vector, having the similar bitrate and the quality data using the k-nearest neighbor model comprises:

evaluating a similarity metric between the feature vector for the segment of media content and feature vectors associated with the media content segments in the training set; and determining the k-nearest neighbors having the similar bitrate and the quality data corresponding to the feature vector based on the similarity metric.

25. The non-transitory computer-readable storage medium of claim 17, further comprising the instructions to:

train the k-nearest neighbor model using the training set of the media content segments that span a spatio-temporal complexity space.

26. A non-transitory computer-readable storage medium having instructions that, when executed by a computing device, cause the computing device to:

train a k-nearest neighbor model using a training set of media content segments that span a spatio-temporal complexity space, wherein training the k-nearest neighbor model comprises:
  generating bitrate versus quality data across multiple resolutions for each media content segment in the training set;
  extracting feature vectors that are relevant to identify k-nearest neighbors having similar bitrate and quality data by performing video analysis on each media content segment; and
  storing the feature vectors, the bitrate, and the quality data for the training set;
receive a segment of media content, a predefined maximum bitrate, and a predefined maximum quality measure;
determine the k-nearest neighbors having the similar bitrate and the quality data to the segment of media content using the trained k-nearest neighbor model, wherein the k-nearest neighbors are determined from the training set of media content segments;
determine at least one content adaptive encoding parameter for the segment of media content within the predefined maximum bitrate and the predefined maximum quality measure using the determined k-nearest neighbors, wherein the at least one content adaptive encoding parameter is inputted to an encoder to encode the segment of media content.

* * * * *